Dec. 6, 1966  B. E. JOHNSON ET AL  3,290,206
CURL RESISTANT LAMINATE
Filed June 14, 1965
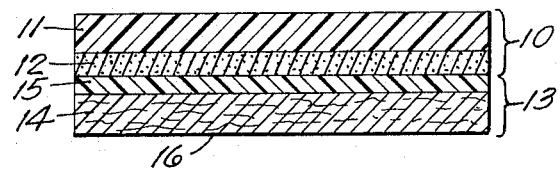
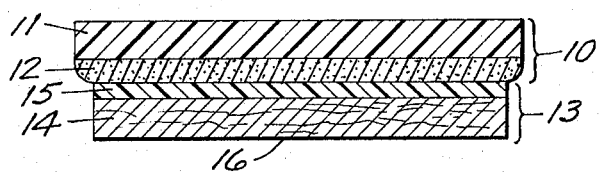
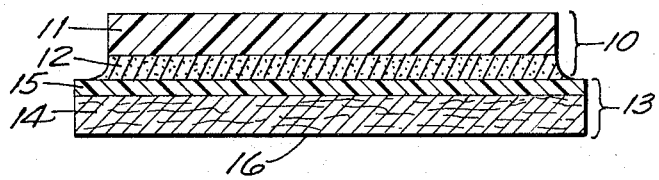
INVENTORS
JAMES V. ERWIN
BRUCE E. JOHNSON
BY
Carpenter, Kinney & Coulter
ATTORNEYS United States Patent Office 3,290,206
Patented Dec. 6, 1966

3,290,206
CURL RESISTANT LAMINATE
Bruce E. Johnson, White Bear Lake, and James V. Erwin, North St. Paul, Minn., assignors to Minnesota Mining and Manufacturing Company, St. Paul, Minn., a corporation of Delaware
Filed June 14, 1965, Ser. No. 463,790
7 Claims. (Cl. 161—164)

This is a continuation-in-part of application Serial No. 32,718, filed May 31, 1960 now abandoned.

This invention relates to a laminate of a pressure-sensitive adhesive coated sheet and a disposable strippable liner, wherein the sheet and the liner have substantially different hygroexpansivity characteristics. A preferred embodiment of this invention is a curl-resistant processable decorative sheet assembly in which the liner is substantially more hygroexpansive than the adhesive coated sheet.

Decorative adhesive-coated films are often used out-of-doors, or exposed to humidity or temperature extremes; accordingly it is desirable to have such films made of materials which are essentially unaffected by moisture or temperature changes, e.g., made of oriented polyethylene terephthalate. In order to protect the adhesive coating and/or to facilitate processing, such adhesive-coated films are often provided with "throwaway" liners selected primarily on the basis of their low cost, but inexpensive paper liners characteristically swell when exposed to increased humidities, and inexpensive plastic films are too limp and/or have thermal expansion coefficients greater than that of the decorative film. These desiderata—a heat- and moisture vapor-resistant adhesive-coated film and an inexpensive liner—are so antithetical that, insofar as we are aware, no one heretofore has been able to devise a commercially feasible decorative sheet-liner assembly which will remain flat and processable over the normal range of humidities and temperatures encountered during manufacture and prior to stripping off the liner and applying the decorative sheet. The best prior art products have thus been a generally unsuccessful attempt to combine pressure-sensitive adhesive coated polyester films and kraft paper liners. Perhaps the most troublesome feature of prior art sheet assemblies utilizing paper liners, is the manner in which they curl drastically during processing, especially where the consumer prints the decorative sheet himself, causing excessive wrinkling, irregular shape, and out-of-register printing.

Our invention thus particularly relates to a composite sheet assembly of a tacky pressure-senstiive adhesive sheet protected by an inexpensive liner, such as paper, which assembly would normally be expected to curl upon any marked humidity change, but which, when employed in accordance with the teachings hereof remains flat, processable, and usable over a wide range of temperatures and humidities. For example, a preferred embodiment of our novel sheet assembly can be prepared in roll form, decorated, printed, colored, slit, cut to desired dimensions (up to at least 10 or 12 feet long in the case of airplane, train, or truck insignia), and heated to temperatures of 140°–150° F. or higher for at least an hour to cure alkyd-based printing ink—all without curling, distorting, or delaminating. These operations may be carried out during winter or summer, and wherever desired. Our sheet assembly may be stored in relative humidities of 90%—or even approaching 100% (such as often occurs in Gulf States during the summer) and thereafter printed without curling; similarly it remains flat at relative humidities approaching 0%, as is common in the low humidity northern winter climates. Likewise our sheet assembly remains flat and the adhesive sheet may be readily separated from the liner and applied in extremely varied ambient conditions.

Our invention embodies the novel combination of a sheet coated over one surface with a firmly adherent readily distortable, soft, compliant, cold flowable tacky pressure-sensitive adhesive, and a slowly hygroexpansive adhesive-covering liner having substantially higher total hygroexpansion than said sheet, the liner being provided with a surface possessing extremely low energy release characteristics. We thus provide a product which meets a long standing need in the industry.

The manner in which our novel combination functions will be readily understood by reference to the attached drawings in which like numbers refer to like parts in the several views and in which:

FIGURE 1 is an enlarged diagrammatic view in cross-section of a sheet assembly prepared under conditions of an intermediate relative humidity, e.g., 50%;

FIGURE 2 is a view of the assembly shown in FIGURE 1, illustrating the effect of extremely low relative humidity on the components; and FIGURE 3 is a view of the assembly shown in FIGURE 1, illustrating the effect of extremely high humidity on the components.

In the drawings, label 10 comprises polyester film 11 coated over one surface with a highly surface-distortable compliant tacky adhesive 12, the latter being protectively covered by liner 13. Liner 13 comprises a paper or other hygroexpansive base 14, coated on its adhesive-contacting surface with low energy release layer 15 and provided at its other surface with a slowly moisture vapor-transmitting skin 16. Label 10 may be decorated in one or more of several ways—e.g., it may be made reflective by the vapor deposition of a layer of metal on the back prior to applying adhesive 12. Similarly, the face of the label may be provided with a colored layer and/or printed in one or more colors.

As the sheet assembly is moved from the intermediate humidity conditions illustrated in FIGURE 1 to the low humidity conditions illustrated in FIGURE 2, the swelling moisture present in the paper fibers is slowly lost through skin 16, and paper 14 slowly contracts. This contraction exerts a shearing effect on adhesive 12, and the combined low energy release characteristics of layer 15 and the distortability of the surface of adhesive 12 permit the liner to slide with respect to the adhesive, thereby keeping the assembly flat instead of causing it to curl liner side in. Similarly, when the laminate is moved to a higher humidity, as is indicated in FIGURE 3, paper 14 slowly expands, the liner-contacting surface of adhesive 12 distorting under this shearing action along release layer 15 to permit liner 13 to expand without curling the laminate liner side out.

Our invention will be better understood by reference to the illustrative but non-limitative examples set forth below.

PREPARATION OF PAPER STOCK HAVING LOW ENERGY RELEASE SURFACE

A liner was prepared from 60 lb. kraft paper which had been coated on one surface with 18 lbs. of clay per ream. This paper has a hygroexpansivity such that after being conditioned at 5% relative humidity for 48 hours and thereafter moved to 75% relative humidity, it expands 0.68% in about 1 hour. It has been found that an effective way to predict the rate of hygroexpansivity of a sheet is to measure its moisture vapor transmission rate. A useful test for moisture vapor transmission involves the use of a "Vapometer," in which a paper disc is peripherally clamped over a container partially filled with water, a 2½-inch diameter disc of the paper being exposed and serving to provide the only means of contact between the atmosphere inside and outside the container. The container plus the paper disc is then placed in a room maintained at a constant temperature of 77° F. and a relative humidity of 50% and weighed at 24-hour intervals. The moisture vapor transmission rate of the kraft paper employed in this example was found to be about 350 grams per square meter per 24 hours.

To the mineral-coated surface of the kraft paper was applied a 5% xylene solution of a low energy release dimethyl polysiloxane polymer having silanic hydrogen cross linking sites ("Syl-off 23," supplied in 30% xylene solution at a viscosity of about 10,000–12,000 cps. by the Dow Corning Corporation), to which had been added about about 1% of a metal soap catalyst, e.g., tin octoate, based on polysiloxane solids, to provide a coating weight of about 0.5 dry grain per 24 square inches. The coating was cured about 10 minutes at 300° F. The rates of hygroexpansion and moisture vapor transmission remained essentially unchanged. When a strip of conventional cellophane tape having a tacky pressure-sensitive acrylate adhesive of the type described in Example 5 of Ulrich U.S. Patent 2,884,126 (available commercially from Minnesota Mining and Manufacturing Company under the trade designation "810" standard tape) was applied to the cured polysiloxane surface and a roller used to insure intimate contact between the adhesive and the polysiloxane surface, adhesion was extremely low; in fact, the tape could readily be removed from the liner by slowly pulling it back over itself at 180° with a force of less than ½ ounce per inch of width.

*Example 1*

To the low energy release surface of the kraft paper treated as described above, was now applied from solvent solution an extremely soft and compliant 95.5:4.5 copolymer of 2-ethyl hexyl acrylate:acrylic acid, of the type described in Ulrich U.S. Patent No. 2,884,126. The adhesive-coated liner was then heated to a temperature of 200° F. for approximately two minutes to drive off the solvent, after which the adhesive surface was found to be extremely tacky, compliant, and readily distortable. To the adhesive-coated surface of the liner was now laminated a 1-mil film of biaxially oriented polyethylene terephthalate, the adhesive-contacting surface of the film having previously been coated with a thin layer of aluminum by a metal vapor deposition process. The exposed surface of the liner was next provided with a moisture vapor retarding backsize "skin" by applying from solvent approximately 7 dry grains per 24 square inches of a vinylidene chloride:acrylonitrile copolymer ("Saran F-220," sold by the Dow Chemical Company) and the solvent evaporated. About 1 dry grain per 24 square inches of cellulose acetate butyrate dissolved in methyl ethyl ketone was then applied to provide a surface coating which resists blocking when in contact with printing inks, and the solvent evaporated by heating at 150° F. for 3 minutes. When placed in relative humidities ranging from 0% to 94%, this laminate remained perfectly flat. The force required to separate the adhesive-coated film from the liner at a peel angle of 180° and a speed of 12 inches per minute ("stripback adhesion") was measured on an "Instron" tensile tester maintained at 77° F. and 50% relative humidity, and found to range from 5 to 10 grams per inch of width. Nevertheless, the adhesive was aggressively tacky when in contact with other surfaces; even after the laminate had been stored for several months, the decorative sheet could be firmly and permanently adhered to commercial airplane fuselages.

A portion of the liner was removed from the adhesive surface of the film and subjected to the same hygroexpansion and moisture vapor transmission tests previously described in connection with the untreated paper. It was found that the liner expanded less than 0.1% in 3 hours, that dimensional equilibrium (0.68% expansion—the same as for the original kraft paper) was not reached for approxiamtely 36 hours, and that the moisture vapor transmission rate was 10 grams per square meter per 24 hours.

A useful numerical term for measuring the compliance and ready distortability of the pressure-sensitive adhesive used in this example is the constant stress modulus described in Hendricks and Dahlquist U.S. Patent No. 2,601,016, column 9, lines 50–75 and column 10, lines 1–14. This test, the description of which is incorporated herein by reference, provides for casting a film of the desired adhesive (e.g., on mercury or polytetrafluoroethylene) and applying an elongating force which is decreased as the adhesive cross-section is reduced, thereby providing a constant stress of 1000 grams per square centimeter of cross-section. In preparing the film, care should be taken to avoid temperatures above, e.g., 100° F., which may either degrade or crosslink certain adhesives and give inaccurate test values. As determined according to this test, the constant stress modulus for the adhesive of this example after 10 minutes of stress at 77° F. was 0.143 megadyne per square centimeter.

Other copolymers of 2-ethyl hexyl acrylate and acrylic acid copolymers having different ratios of acrylate to acrylic acid may also be satisfactorily employed as pressure-sensitive adhesives. Adhesives having lower ratios may be used to make sheet assemblies which remain flat at widely varying humidities but have some tendency to "ooze" when subjected to pressure such as may be applied when the product is wound in roll form. It is noted that the constant stress modulus of a 93.5:6.5 copolymer, for example, is 0.0772 megadyne per square centimeter. Such a low-modulus adhesive is especially useful when the label on which it is coated is to be applied at low temperatures, e.g., less than 30° F.

*Example 2*

A decorative sheet-liner assembly was made in exactly the same way as described in Example 1, the only difference being the pressure-sensitive adhesive, which was a so-called "bakelized" acrylate in which a 75:25 2-ethyl butyl acrylate:ethyl acrylate copolymer was modified with a small amount of an oil-soluble p-tertiary amyl phenolformaldehyde resin having a phenol-formaldeyhde ratio of 1:1.5. Acrylate adhesives of this type are described in Ebel U.S. Patent No. 2,553,816; the constant stress modulus was found to be 0.278 megadyne per square centimeter. The assembly of this example remained flat in relative humidities ranging from 0 to over 94%. Stripback adhesion as defined in Example 2 was found to range from 2 to 5 grams per inch of width. The decorative sheet was highly suitable for label use.

*Example 3*

A decorative sheet-liner assembly was prepared as in Example 1, using still another pressure-sensitive adhesive and a lower quantity of polyvinylidene chloride as the moisture vapor barrier backsize for the liner. The adhesive system in this case was a 95.5:4.5 isooctyl acrylate:acrylic acid copolymer having a constant stress modulus of 0.200; this polymer is disclosed in Example 5 of Ulrich U.S. Patent No. 2,884,126. In this case only 3 dry grains per 24 square inches of the polyvinylidene chloride backsize was applied, the moisture vapor transmission of the liner being 42 grams per square meter per 24 hours. This sheet assembly remained flat at all relative humidities up to 94%. Stripback adhesion was found to range from 3 to 5 grams per inch of width; the decorative sheet was suitable for label use.

It has been found that the moisture vapor transmission rate may be still higher than that set forth in this example—e.g., as high as 100 grams per square meter per 24 hours—provided the stripback adhesion is maintained below about 3 grams per inch of width. Higher moisture vapor transmission rates can be tolerated if the laminate is formed while the paper is maintained in equilibrium with an intermediate relative humidity of, say, 50%. The humidity may conveniently be maintained at such a level through the use of a water-dispersed backsize coating. Although expansion and contraction of the liner will take place, it is still possible to maintain a substantially flat product. Generally speaking, however, the lower the moisture vapor transmission rate, the better, and values on the order of 10 g./m.²/24 hrs., or less, are preferred. Coatings of polyethylene, polyesters, ethyl cellulose, or many other moisture vapor retardant materials may be employed, and, if desire, such coatings may be applied to both surfaces of the paper base of the liner.

*Example 4*

A laminate was made in the same way as that described in Example 1, except that the adhesive employed was a 50:50 copolymer dispersion of methyl isoamyl acrylate and fused oil acrylate, as set forth in Kalleberg U.S. Patent No. 2,889,038, Example 5, first adhesive. This adhesive had a constant stress modulus of 0.500, and it was noted that it was substantially firmer and less readily distortable than those described in preceding examples. The finished laminate remained flat at relative humidities ranging from 0 to 94%. Stripback adhesion was 3 to 4 grams per inch of width, and the decorative sheet was suitable for label use on appliances where operating temperatures exceeded 150° F.

Adhesives which are not soft and compliant, e.g., those having a constant stress modulus of 0.625 or more, are generally unsuited for adhesives used in preparing sheet assemblies of the type we describe. Speaking in general terms, however, decorative sheets which are significantly stiffer than 1-mil polyester film (either because they are thicker or because they are made of materials having a higher Young's modulus) may be employed with adhesives having a higher constant stress modulus. Extremely soft, compliant adhesives are effective with liners having higher release values, e.g., stripback adhesion values of 20 or 30 grams per inch of width. Similarly, hard adhesives may be partially compensated for by using liners having stripback adhesion values of 3 grams or less per inch of width. It should be noted, however, that it is the portion of the adhesive in contact with the liner which is important; thus, a relatively hard adhesive may be in contact with the decorative film, provided that a soft compliant adhesive is in contact with the liner. Although the acrylate adhesives described in the predceding examples are generally preferred because of their permanence, clarity, and strength, such other soft compliant adhesives as 50:50 Buna S:natural rubber blends and polyisobutylene-based systems can be used to make products which are flat at humidity extremes and are useful for many applications.

Although we generally prefer as decorative sheet backings films formed from polyesters, such as linear condensation polymers of various glycols and terephthalic acid (which may contain up to 10% isophthalic acid), we may employ any suitable backing which can be readily decorated. For example, films of methyl methacrylate, polyvinyl chloride, polystyrene, polyimides, and polycarbonates lend themselves to applications of this type, particularly where processing is carried out at or near room temperature.

What we claim is:

1. A decorative sheet assembly wherein a decorated pressure-sensitive adhesive sheet is removably adhered to a liner having substantially higher total hygroexpansion than said sheet, which assembly remains substantially flat at widely varying humidities and temperatures, comprising in combination: a decorated sheet having low total hygroexpansion coated over one surface with a firmly adhered pressure-sensitive adhesive, a readily strippable paper based liner having a low energy release surface in contact with and protectively covering the entire surface of said adhesive, the adhesion of pressure-sensitive adhesive tape to the low adhesion surface of said liner being in the range of 3–10 grams per inch of width when measured as defined herein, the exposed surface of said liner being provided with a substantially continuous moisture vajor retardant polymeric skin so that said liner has a moisture vapor transmission rate as defined herein of not more than about 100 grams per square meter per 24 hours, the moisture vapor transmission rate of said liner in the absence of said skin being on the order of 350 grams per square meter per 24 hours, the surface portion of said pressure-sensitive adhesive which is in contact with said liner having a constant stress modulus as defined herein in the range of 0.1 to 0.3 megadyne per square centimeter.

2. The decorative sheet assembly of claim 1 wherein the portion of the liner which contacts the pressure-sensitive adhesive is provided with a polymeric low energy release layer comprising a dimethyl polysiloxane cured through silanic hydrogen sites.

3. The sheet assembly of claim 2 wherein the moisture vapor transmission rate of said liner is on the order of 10 grams per square meter per 24 hours.

4. A separable laminate wherein a decorated pressure-sensitive adhesive sheet is strippably adhered to a liner having a substantially higher total hygroexpansion than that of said sheet, which laminate remains substantially flat at relative humidities ranging from bone dry to at least 85% and at temperatures up to 140° F. or higher, comprising in combination: an oriented polyester film formed from a linear condensation polymer of glycol and a phthalic acid consisting essentially of at least a major portion of terephthalic acid, said film being coated over one surface with a pressure-sensitive adhesive having a constant stress modulus of not more than 0.5 megadyne per square centimeter and capable of being firmly adhered to a surface at a temperature as low as 30° F., the entire surface of said ahesive being contacted, covered and protected by a slowly hygroexpansive readily strippable liner which can be readily removed by applying a force of about 3–10 grams per inch of width without transfer of said adhesive to said liner and which has a low moisture vapor transmission rate, a rate of thermoexpansion of the same order as that of said polyester film and a low rate of hygroexpansion approaching that of said polyester film, said liner comprising a highly moisture vapor transmitting rapidly hygroexpansive paper provided at its adhesive-covering surface with a low energy release layer and provided at its exposed surface with a substantially continuous expansible, contractible skin of a polymeric material having substantially lower rates of moisture vapor transmission and hygroexpansion than said paper, said adhesive being readily distortable at its liner-contacting surface to permit said liner to move independently of said film.

5. The separable laminate of claim 4 wherein the portion of the liner which contacts the pressure-sensitive adhesive is provided with a polymeric low energy release layer comprising a dimethyl polysiloxane cured through silanic hydrogen sites.

6. A separable laminate wherein a pressure-sensitive adhesive sheet is adhered to a readily strippable liner of substantially different total hygroexpansion, which laminate remains substantially flat at widely varying humidities and temperatures, comprising in combination: a sheet coated over one surface with a firmly adhered pressure-sensitive adhesive, a readily strippable low energy release liner having approximately the same total thermoexpansion as said sheet and having substantially different total hygroexpansion from said sheet protectively covering and contacting the entire surface of said adhesive, the adhesion between pressure-sensitive adhesive tape and the surface of said liner which is in contact with said adhesive coated surface being in the range of about 3–10 grams per inch of width when measured as defined herein, the exposed surface of said liner being provided with a moisture vapor-retarding polymeric skin, said liner and said sheet differing by not more than about 0.1% in expansion when conditioned at 5% relative humidity and thereafter placed in 75% relative humidity for 3 hours, the surface portion of said pressure-sensitive adhesive coating which is in contact with said liner having a constant stress modulus as defined herein of not more than about 0.5 megadyne per square centimeter.

7. A decorative sheet assembly wherein a decorated pressure-sensitive adhesive sheet is removably adhered to a liner having substantially higher total hygroexpansion than said sheet, which assembly remains substantially flat at widely varying humidities and temperatures, comprising in combination: a decorated sheet having low total hygroexpansion coated over one surface with a firmly adhered pressure-sensitive adhesive, a readily strippable paper based liner having a low energy release surface in contact with and protectively covering the entire surface of said adhesive, the adhesion of pressure-sensitive adhesive tape to the low adhesion surface of said liner being in the range of 3–10 grams per inch of width when measured as defined herein, the exposed surface of said liner being provided with a substantially continuous moisture vapor retardant polymeric skin so that said liner has a moisture vapor transmission rate as defined herein of not more than about 40 grams per square meter per 24 hours, the surface portion of said pressure-sensitive adhesive which is in contact with said liner having a constant stress modulus as defined herein of not more than about 0.5 megadyne per square centimeter.

References Cited by the Examiner

UNITED STATES PATENTS

| | | | |
|---|---|---|---|
| 2,496,349 | 2/1950 | Kellgren et al. | 161—406 |
| 2,607,711 | 8/1952 | Hendricks | 161—406 |
| 2,882,183 | 4/1959 | Bond et al. | 161—167 X |
| 2,985,554 | 5/1961 | Dickard | 161—406 X |
| 3,152,950 | 10/1964 | Palmquist et al. | 161—406 X |

EARL M. BERGERT, *Primary Examiner.*

MORRIS SUSSMAN, *Examiner.*